No. 758,293. PATENTED APR. 26, 1904.
E. M. BENTLEY.
ELECTROMAGNETIC GEARING.
APPLICATION FILED DEC. 2, 1903.
NO MODEL.
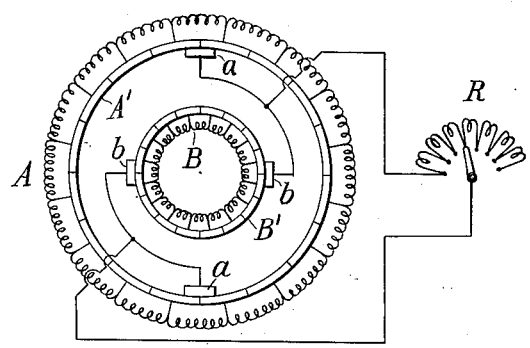
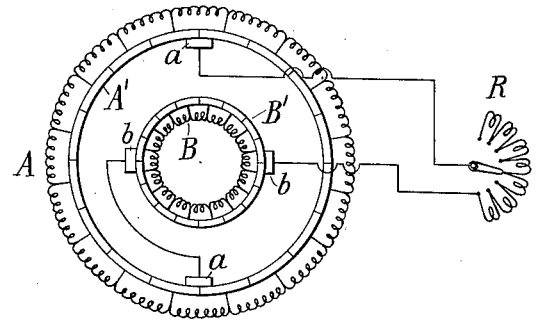
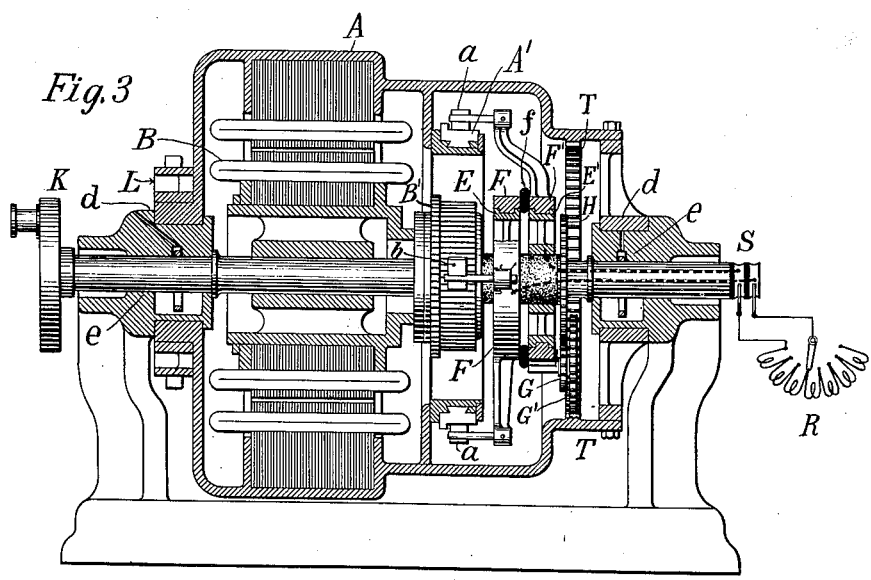
Witnesses:
Z. J. Shaw
J. B. Gately.
Inventor
Edward M. Bentley No. 758,293.

Patented April 26, 1904.

UNITED STATES PATENT OFFICE.

EDWARD M. BENTLEY, OF LAWRENCE, NEW YORK.

ELECTROMAGNETIC GEARING.

SPECIFICATION forming part of Letters Patent No. 758,293, dated April 26, 1904.

Application filed December 2, 1903. Serial No. 183,497. (No model.)

*To all whom it may concern:*

Be it known that I, EDWARD M. BENTLEY, a citizen of the United States, residing at Lawrence, county of Nassau, and State of New York, have invented certain new and useful Improvements in Electromagnetic Gearing; and in pursuance of the statute I have set forth in the accompanying drawings and specification as an illustration of the invention that form thereof which I now regard as the best one of the various forms in which the principle of the invention may be embodied.

In the drawings, Figures 1 and 2 show diagrams of circuits; and Fig. 3 shows a machine, partly in section.

My invention relates to a dynamo-electric machine particularly designed to serve as a transmitting agency between driven and driving mechanism and when so used enables the driving mechanism to operate at a substantially constant or other desired speed, while the driven mechanism runs at a speed that varies with respect to that of the driver.

My invention may also be employed in any situation where it is desired to derive from a dynamo-electric machine the effect of a speed different from that at which it may actually be running.

Referring to Fig. 1, A represents the winding of a field-magnet, having a commutator A'. The winding is like that of an armature, and it is well understood that if current is delivered to such a winding by brushes bearing on the commutator at opposite points poles will be produced in the field-magnet at points corresponding in position to the location of the brushes on the commutator and also that the poles may be caused to rotate by rotating the brushes on the commutator, so as to give the effect of the well-known rotary poles produced by multiphase alternating currents. In the present case I have shown for convenience a bipolar machine with two field-magnet brushes *a a* bearing on commutator A' one hundred and eighty degrees apart. In the same figure, B represents an armature-winding connected to a commutator B', with brushes *b* bearing thereon in quadrature with brushes *a*. The machine is connected as a series machine short-circuited on itself, the brushes *b* being connected to brushes *a*, so as to put the field and armature in series. In such an arrangement it is manifest that if the field-magnet and all four brushes be stationary while the armature is rotated the conditions will be those of an ordinary series dynamo and a current will be generated in the armature which will energize the field-magnet in the usual way. On the contrary, if the armature and all four brushes be stationary and the field-magnet rotated no current will be generated, because there will be no movement of the armature-coils with respect to the magnetic lines of force, since the field-magnet so predominates in strength as a magnet that if any current could be imagined as flowing it would establish field-magnet poles at the brushes *a a*, which are stationary with respect to the armature, and not at the brushes *b b*. This would be the condition of substantially no current. In other words, the field-magnet poles under every condition that will produce current must be at the brushes *a a* and if those brushes are moved will follow them. From this it appears that if the armature be rotating with respect to the field-magnet we may by rotating the four brushes change the effective or generative movement as distinguished from the total movement to any extent desired. Thus if the field-magnet be stationary and the armature rotates at eight hundred turns per minute while the four brushes are rotated in the same direction seven hundred and sixty turns per minute the effective or generative movement of the armature-coils with respect to the field-magnet poles will be but forty turns per minute. Since the brushes may be freely rotated, this effective component can be varied at will, according to the speed of rotation of the brushes. By putting the field-magnet in series with the armature or by otherwise making the potential difference between the field-magnet terminals very low the commutating difficulties at the field-magnet commutator will be greatly reduced.

If the described arrangement be utilized in a motor on a constant-potential circuit, a rotation of the brushes in the same direction as the motor rotation will decrease the counter electromotive force of the motor and allow an increase of current. The energy thus developed by the motor, which is the product of its current by its counter electromotive force, will consist largely in the current factor, while, on the other hand, the rotating of the brushes in the opposite direction will increase the counter electromotive force and decrease the current and the motor energy will consist largely in the counter-electromotive-force factor. The rotation of the brushes does not, of course, represent energy, but merely produces a self-inductive effect similar to that of a transformer or inductance coil, the induced electromotive force being commutated and acting with or against the impressed electromotive force, according to the direction of rotation of the brushes.

The foregoing arrangement may be utilized in various ways, and the rotation of the brushes may be produced by a special motor or by other means and electrical communication with the brushes established by slip-rings in a manner familiar to the art. I have, however, conceived of applying the contrivance to transmit power between a driving-motor—such, for instance, as a gas-engine or a synchronous alternating-current motor which runs at a constant speed or at a speed different from that of the mechanism driven thereby—and such driven mechanism. To this end I connect one of the members of the dynamo-electric machine, either the field-magnet or armature, to the driving agency and the other member to the driven mechanism and short-circuit them one on the other. In such a situation the machine serves only as a gearing to connect the driver with its load and not as a producer of power. Hence the slip between armature and field will be only that required to produce enough current to give in the field-magnet such a magnetic field that the resistance which it presents to the traverse of the armature-conductors through it will be equal to or greater than the torque required to operate the load. Such a current only requires an electromotive force adequate to overcome the internal resistance of the machine. If the machine with a given field-magnet strength would when acting as a generator produce its full load at eight hundred turns per minute, of which load the internal resistance of the machine represented five per cent., then but forty turns per minute would be required for giving the same field-magnet strength if the external load were removed and the machine short-circuited. Assuming such field-magnet strength to be adequate to resist the driving torque applied by the operating-engine to its load when the machine is interposed between them, then the load would rotate at seven hundred and sixty turns per minute if the engine ran at eight hundred turns. The loss in transmission would be the $C^2 R$ loss in the dynamo. These figures would be modified for a series machine, but may be used to illustrate the principle. When, however, the load is to run at a lower speed—say at four hundred turns per minute—the slip will be four hundred instead of forty, and if there were no provision to the contrary the difference of three hundred and sixty turns would produce a heavy current in the machine that would injure it or cause a large loss in heat, assuming that the slip remains at four hundred. It is such loss at low speeds of the driven load and correspondingly large slips that I seek to avoid, and I do this by constructing the dynamo in the manner illustrated in the diagram of Fig. 1, and then by rotating the brushes I may cause any desired fraction of the total slip to be alone effective in producing current. I thus restrict the current-generating capacity of the machine at all times to the point which will enable it to serve its function as a gear without producing needless current as a generator. If the load runs at half-speed with a slip of four hundred, the brushes will be rotated three hundred and sixty and the armature can only traverse the magnetic field at the required rate of forty. This speed of the brushes may be increased or decreased at will to give any torque that will produce the required speed of the load. At full speed of the load the brushes will stand still, and when the load stands still the brushes will run nearly at the same rate as the slip. This rotation of the brushes may be produced by a motor of any kind and in any desired manner; but for convenience I prefer to rotate them by the mechanism itself and to give them a fixed ratio of speed to the slip, so that at all times the effective slip will be a definite number of turns per minute, and then to vary the torque at that slip by means of an adjustable resistance either in series with the field-magnet and armature or in shunt thereto. In Figs. 1 and 3 such a resistance is shown in the latter relation at R; but if it is to be in series it will be interposed between one of the brushes $a$ and a brush $b$, as shown in Fig. 2, the necessary slip-rings being provided therefor in an actual machine.

In Fig. 3, B is an armature, and A is a field-magnet rotating in bearing $d$ external to the armature-bearings $e$. The armature is driven by any suitable means, which is indicated by a crank $k$, while the field-magnet serves to drive any desired mechanism through a sprocket-wheel L. A' is the field-magnet commutator and B' that of the armature. One of the brushes of the field-magnet is carried by a ring F, which also carries one of the armature-brushes $b$ and electrically connects the two brushes. The ring F is free to rotate on a bearing E, insulated from but mounted on the armature-shaft S. The remaining two brushes are similarly carried by ring F', rotating on bearing E'. There is thus established a short-circuiting connection from one brush $a$ to ring F, to one brush $b$, through armature B to opposite brush $b$, (not shown,) to ring F', to opposite brush $a$, through field-magnet winding to first brush $a$. Both sets of brushes are rotated together, the rings F and F' being mechanically connected by an insulating-ring $f$ by means of pinions G and G' on a common shaft, which has a bearing in the ring F'. The pinion G engages with gear-wheel H on the armature-shaft S, and the pinion G' engages with internal gear-wheel T on the field-magnet frame. This gives the brushes a differential rate of rotation dependent on the gearing ratio in the two sets of gears, respectively. If the field is stationary and the slip eight hundred, then the brushes will rotate seven hundred and sixty in the same direction as the armature. If, however, the field-magnet rotates in the same direction at a speed of seven hundred and sixty and the slip becomes forty, then the brushes will stand still, the gearing ratio being adjusted to that end. In any event there will be forty turns of the slip available for generation, or, in other words, the rate at which the armature-conductors traverse the magnetic field will be always forty whatever the slip. The shunting resistance R is connected between two contact-rings on the extremity of shaft S, which are connected, respectively, to carrier-rings F and F' by means of conductors pressing through the shaft from each contact-ring to one of the bearings E and E', on which the carrier-rings rotate. The connections will then be as diagramed in Fig. 1. If the resistance R is entirely short-circuited, no current will be generated, and if, on the other hand, it is entirely open-circuited the generated current will be that due to the relative movement of field-magnet and armature at a rate equal to the rate of speed of the brushes and with full field-magnet strength. Between these extremes the current will be due to the same speed, but of a value dependent on the field-magnet strength as determined by the adjusting effect of the shunting resistance R. Instead of the shunting relation of the resistance shown in Fig. 1 the series relation shown in Fig. 2 may be provided in a manner obvious to one skilled in the art—as, for example, by a slip-ring connection between brush $a$ and brush $b$, containing the resistance R.

The described arrangement for giving the brushes a speed that varies in a definite relation to the slip does not give the utmost economy of which the device is capable, but is one that is convenient and of an efficiency that is adequate for most purposes. In the case assumed it would be somewhat more efficient to give the field-magnet its undiminished strength and then vary the effective slip above or below forty as might be required. For instance, if a very small torque were required it might be secured with an effective slip of twenty, and, on the other hand, a very large torque might require sixty, while to set it rigidly at forty limits the torque to that afforded by the current which will result from that slip, and for smaller torques a slight loss will be incurred by unnecessary speed of slip. These objections are more than counterbalanced by the simplicity of the arrangement. I intend, however, to embrace by this patent all arrangements wherein the actual slip is made effective slip to any desired degree, whether that degree be large or small or whether it is adjusted exactly or only approximately to the torque or to any other feature that serves as the object toward which adjustment is directed.

What I claim as new, and desire to secure by Letters Patent, is—

1. The combination with a dynamo-electric machine having one member movable with respect to a magnetic field in the other member, of means for adjusting the effective rate of such relative movement comprising a pole-shifting device for rotating the poles of the magnetic field simultaneously with the mechanical rotation.

2. The combination with a dynamo-electric machine of a regulator acting to vary the effective rate of relative movement of field-magnet poles and armature comprising a pole-shifter for the field-magnet giving the poles a rotation adjustable for regulation and supplementary to the relative mechanical movement of field-magnet and armature.

3. A regulator for a dynamo-electric machine acting to vary the effective rate of relative movement of field-magnet poles and armature comprising a pole-shifter for the field-magnet giving the poles a rotation adjustable for regulation and supplementary to the relative mechanical movement of field-magnet and armature.

4. A regulator for a dynamo-electric machine acting to vary the effective rate of relative movement of field-magnet poles and armature comprising a continuously-running pole-shifter for the field-magnet operating at a rate adjustable for regulation and different from the rate of relative movement between field-magnet and armature.

5. A regulator for a dynamo-electric machine acting to vary the effective rate of relative movement of field-magnet poles and armature comprising a pole-shifter for the field-magnet and a motive device therefor giving it a rate adjustable for regulation and different from the rate of relative movement of field-magnet and armature.

6. The combination with a dynamo-electric machine having one member connected to driven and the other to driving mechanism of means for rendering a portion only of the slip effective for generation of current.

7. The combination with a dynamo-electric machine having one member connected to driven and the other to driving mechanism of means for rotating the magnetic field to produce an effective slip different from the actual slip.

8. The combination with a dynamo-electric machine having one member connected to driven and the other to driving mechanism of means for closing the armature-circuit on itself and means for giving the poles of the field-magnet a rotation supplementary to their mechanical rotation.

9. The combination with a dynamo-electric machine having one member connected to driven and the other to driving mechanism, a commutator for the field-magnet, brushes thereon and means for rotating the brushes to give the field-magnet poles a rotation supplementary to the mechanical rotation.

10. The combination with a dynamo-electric machine having both of its members rotatable, of means for rotating the field-magnet poles within the body of the field-magnet at a rate different from the rate of relative movement of the two members.

11. The combination with a dynamo-electric machine having both members rotatable, of driving mechanism connected to one member and driven mechanism connected to the other member, means for rendering a portion only of the slip effective for generation of current and a regulating device for adjusting the amount of current produced.

12. The combination with a dynamo-electric machine, of means for rendering a portion only of the relative movement of the two members effective for generation of current, and a regulator for adjusting the amount of current produced.

13. The combination with a dynamo-electric machine, of means for rendering a portion only of the relative movement of field-magnet and armature effective for current generation, electrical connections for putting the field-magnet in series with the armature and an adjustable resistance for regulating the current produced.

14. The combination with a dynamo-electric machine having both of its members rotatable, of a commutator for the field-magnet, a commutator for the armature, a driving connection between the brushes of both commutators and the shaft of the machine, and a resistance for regulating the generated current.

15. The combination with a dynamo-electric machine having both of its members rotatable, of a commutator for both members, commutator-brushes thereon, and differential gearing for rotating the brushes by the differential movement of the respective members, slip-ring connections for the rotating brushes and a regulating resistance connected in circuit through said slip-rings.

16. The combination with a dynamo-electric machine of a commutator for both field-magnet and armature, rotating brushes for both commutators and a driving connection between the brushes and the shaft of the machine.

17. The combination with driving and driven mechanism, of a dynamo-electric machine having one member connected to the former and the other to the latter mechanism, a short-circuiting connection for the dynamo, a commutator for both field-magnet and armature, rotating brushes for both commutators and a driving connection between the rotating brushes and the shaft of the machine.

In witness whereof I have hereunto set my hand, before two subscribing witnesses, this 20th day of November, 1903.

EDWARD M. BENTLEY.

Witnesses:
L. T. SHAW,
J. B. GATELY.